United States Patent
Peddada et al.

(10) Patent No.: US 6,295,068 B1
(45) Date of Patent: Sep. 25, 2001

(54) ADVANCED GRAPHICS PORT (AGP) DISPLAY DRIVER WITH RESTRICTED EXECUTE MODE FOR TRANSPARENTLY TRANSFERRING TEXTURES TO A LOCAL TEXTURE CACHE

(75) Inventors: Vijay Peddada, Fremont; Shreekant M. Ranade, Sunnyvale, both of CA (US)

(73) Assignee: Neomagic Corp., Santa Clara, CA (US)

(*) Notice: Subject to any disclaimer, the term of this patent is extended or adjusted under 35 U.S.C. 154(b) by 0 days.

(21) Appl. No.: 09/286,502

(22) Filed: Apr. 6, 1999

(51) Int. Cl.[7] .................................................. G06T 15/00
(52) U.S. Cl. ................................................ 345/419; 345/430
(58) Field of Search ....................................... 345/419, 418, 345/421, 425, 426, 427, 429, 430

(56) References Cited

U.S. PATENT DOCUMENTS

| | | | |
|---|---|---|---|
| 5,047,958 | 9/1991 | Comins et al. | 364/521 |
| 5,185,599 | 2/1993 | Dornink et al. | 340/747 |
| 5,245,702 | 9/1993 | McIntyre et al. | 395/164 |
| 5,291,188 | 3/1994 | McIntyre et al. | 345/189 |
| 5,388,207 | 2/1995 | Chia et al. | 395/164 |
| 5,594,507 | 1/1997 | Hoarty | 348/584 |
| 5,598,525 | 1/1997 | Nally et al. | 395/520 |
| 5,630,043 | 5/1997 | Uhlin | 395/174 |
| 5,757,386 | 5/1998 | Celi, Jr. et al. | 345/507 |
| 5,859,649 | 1/1999 | Yiu et al. | 345/507 |
| 5,859,989 | 1/1999 | Olarig et al. | 395/309 |

*Primary Examiner*—Cliff N. Vo
(74) *Attorney, Agent, or Firm*—Stuart T. Auvinen

(57) ABSTRACT

A graphics system includes an accelerated graphics port (AGP) bus to the graphics accelerator. The graphics accelerator includes a 3D-graphics engine that renders textures, and a local graphics memory. Preferably, the local graphics memory is an embedded DRAM on the graphics-accelerator chip. A portion of the personal computer's main memory is set aside as an AGP memory for storing textures for 3D-graphics rendering. High-level application programs create textures in the AGP memory. A 3D graphics software driver that controls the graphics accelerator manages a texture cache in the local graphics memory. When the high-level application requests that the 3D graphics driver render a texture in the AGP memory, the 3D graphics driver moves the texture to the texture cache. Once the texture has been copied from the AGP memory, over the AGP bus to the texture cache in the local graphics memory, the 3D graphics engine begins rendering the texture. The 3D graphics driver manages the texture cache, invalidating least-recently-used textures and de-fragmenting blocks of textures in the texture cache. The 3D driver transfers the texture to the texture cache, rather than the high-level application. The high-level application is not aware of the texture cache and can use a single handle to the texture. The benefits of the AGP Execute model are achieved without adding AGP-texturing hardware to the 3D graphics accelerator.

20 Claims, 7 Drawing Sheets

PRIOR ART   FIG. 2

ADVANCED GRAPHICS PORT (AGP) DISPLAY DRIVER WITH RESTRICTED EXECUTE MODE FOR TRANSPARENTLY TRANSFERRING TEXTURES TO A LOCAL TEXTURE CACHE

FIELD OF THE INVENTION

This invention relates to graphics systems, and more particularly to software drivers for 3D texture memory.

BACKGROUND OF THE INVENTION

Computer graphics for portable personal computers (PCs) has been greatly improved over the last few years. Embedded dynamic-random-access memory (DRAM) graphics memory has significantly increased the graphics bandwidth, enabling higher resolutions and 3D graphics. See Puar et al., "Graphics Controller Integrated Circuit Without Memory Interface", U.S. Pat. Nos. 5,650,955 and 5,703,806, assigned to NeoMagic Corp. These embedded-DRAM graphics controllers have been used predominantly for portable PC's such as laptop and notebook PCs.

Another attempt to increase graphics bandwidth is a high-speed graphics bus developed by Intel Corp. of Santa Clara, Calif. and others. This bus is known as the accelerated graphics port (AGP). See U.S. Pat. No. 5,859,989 by Olarig et al., and assigned to Compaq Computer Corp.

FIG. 1 is a diagram of a PC with an AGP bus and a 3D graphics accelerator. A microprocessor or central processing unit (CPU) 10 reads and writes main memory 12 through system-logic chip set 16. Peripherals such as disk 18 can be accessed over peripheral component interconnect (PCI) bus 28.

AGP bus 26 is a high-speed expansion bus, typically with only one expansion connector or slot, thus limiting bus loading and increasing speed. Signals on AGP bus 26 are generated by system-logic chip set 16 when CPU 10 accesses graphics accelerator 20 that is plugged into AGP bus 26. Graphics accelerator 20 drives pixels to display 30 and for higher-performance systems may include a three-dimensional 3D graphics engine. These pixels are stored in frame buffer 22 on the graphic card.

The AGP model includes several modes of operation. A portion of main memory 12 may be set aside as AGP memory 14. Textures and Z-buffer data or off-screen surfaces may be stored in AGP memory 14 for use by the graphics system. In particular, 3D surface textures may be stored in AGP memory 14 and later transferred to temporary texture memory 23 on the graphics controller card.

One AGP model, known as the AGP Execute model, has 3D graphics accelerator 20 accessing textures and other surfaces from AGP memory 14 through system-logic chip set 16, over AGP bus 26. The use of the textures from AGP memory 14 is transparent to high-level applications such as 3D computer games. Texture use from AGP memory is just like the use of the texture from local video memory.

Unfortunately, 3D graphics accelerator 20 must have additional hardware to directly access textures from AGP memory 14. This extra hardware adds to the expense and complexity of 3D graphics accelerator 20 and is thus undesirable.

Another AGP model is known as the AGP DMA model. This model does not require the 3D graphics engine to directly access the AGP texture memory. It only has the capability to move the textures from AGP memory 14 to temporary texture memory 23 using a high-speed DMA transfer and the ability to access/render textures in local video memory. Using the DMA hardware through the 3D driver, the high-level application program must perform additional steps to transfer textures from AGP memory 14. Most high-level application programs do not include such steps and thus cannot take advantage of temporary texture memory 23. Only newer application programs that are specifically written for AGP can take advantage of the AGP DMA model.

High Level Applications Complicated by AGP DMA Model—FIG. 2

FIG. 2 is an interface diagram of a high-level application transferring a texture from the AGP memory to the temporary texture memory in the local video memory. Application program 40 is a high-level user program such as a 3D game or animation. Application program 40 must perform low-level AGP tasks such as creating and moving textures from AGP memory 14 to temporary texture memory 23. In the AGP DMA model, the 3D graphics hardware is not capable of directly rendering textures in AGP memory 14.

Instead, application program 40 makes a series of calls to 3D graphics driver 42 to perform a series of steps to define or create textures in each memory 14, 24 and then to transfer the texture data to graphics memory 24. Since graphics memory 24 is on the graphics accelerator card while AGP memory 14 is part of the main system memory, graphics memory 24 is closer to the display pipeline and thus is accessed more quickly by the graphics accelerator. However, the size of graphics memory 24 is limited while the main memory is typically 10 or more times larger in capacity.

First, application program 40 makes call 52 to create a texture in AGP memory 14. This call 52 is passed through 3D graphics driver 42 to AGP memory 14, where a portion of the memory space is set aside as AGP texture 46. Next, application program 40 makes call 54 to 3D graphics driver 42 to create a temporary texture in graphics memory 24. This temporary texture is in temporary texture memory 23, which is an off-screen portion of graphics memory 24 that is not used as the frame buffer.

Once the texture has been defined in both memories 14, 24, application program 40 makes call 56 to 3D graphics driver 42 to perform a bit-block transfer (BLT). The 3D graphics driver uses an AGP-DMA engine to transfer the texture from AGP memory 14 to graphics memory 24, so that AGP texture 46 is copied to temporary texture memory 23.

Finally, application program 40 makes call 58 to 3D graphics driver 42, initiating the 3D engine to render the texture. 3D graphics driver 42 programs the 3D engine's hardware registers with the starting address of the texture in temporary texture memory 23 within graphics memory 24. The 3D engine then uses the texture in the local video graphics memory 24 to render pixels in a triangle in a 3D space being rendered. Pixels within the triangle being rendered by the 3D engine are modified or modulated to show the texture.

Application program 40 must know about graphics memory 24 as well as AGP memory 14 to perform the transfer. Application program 40 must keep track of handles or identifiers of each texture in either AGP memory 14 or in graphics memory 24. A rather complex interface between application program 40 and 3D graphics driver 42 is thus required when the AGP DMA model is used. To avoid redundant transfers, the application also needs to keep track of AGP textures already available in the temporary texture memory (cache management).

FIG. 3 is a structure chart of a high-level application performing under the AGP DMA model. Application program 70 must perform a variety of lower-level tasks to manage the textures when the AGP DMA model is used. Application program 70 sends a memory size for the texture to create-texture process 72, which returns an identifier or handle for the texture to application program 70. Create-texture process 72 then calls processes 78, 80, 82, depending on whether the application requested that a texture be created in the graphics, AGP, or main system memory, respectively, depending on memory availability. For each process 78, 80, 82, create-texture process 72 sends a memory-size parameter to the sub-process, while the sub-process returns a texture handle. These sub-processes 72, 78, 80, 82 are applications-programming interface (API) functions in Microsoft Corporation's DirectX API.

Once the texture has been created in the graphics memory and AGP memory, application program 70 calls handle AGP texture process 74. The handle for the AGP texture is sent by application program 70 to handle AGP texture process 74. These texture handles must be stored in a table or otherwise stored and organized by application program 70. The temporary texture within the local texture memory can be defined by create-texture process 84, which returns a handle to the created texture.

When handle AGP texture process 74 calls copy-texture process 86, source and destination handles are sent identifying textures for block transfer from AGP memory to the local graphics memory. Copy-texture process 86 activates the AGP DMA-transfer engine process 88, which performs the copy of the texture. The driver uses an AGP DMA-transfer hardware accelerator to transfer the texture from AGP memory to local video memory. AGP DMA process 88 is part of the 3D graphics driver.

Finally, application program 70 sends the temporary texture handle when calling render-state process 92. The state of the 3D engine is set when render-state process 92 calls register-program process 90, which programs the 3D engine's registers. Processes 90, 92 are part of the 3D graphics driver.

The high-level application program 70 must manage the texture handles, and perform or call many lower-level functions such as creating textures in each memory, transferring textures among the memories, and rendering. This is undesirable since the high-level application must have many machine-specific details such as knowledge of the memory configuration.

What is desired is a simplified interface between the high-level application program and the graphics driver. It is desired to use AGP functions without adding complex hardware for "texturing" from AGP memory into the 3D graphics engine. It is also desired to transparently manage a copy of an AGP texture in a local graphics memory. It is desired to perform AGP DMA transfers to the local graphics memory transparently to high-level applications.

SUMMARY OF THE INVENTION

A graphics driver for an accelerated graphics port (AGP) personal computer has a set-render process that is called by a high-level application when a texture is ready for rendering by a 3D graphics engine. A handle-texture process is called by the set-render process before the 3D graphics engine is enabled to render the texture. It loads the AGP texture into a texture cache readable by the 3D graphics engine. An AGP-DMA process is called by the handle-texture process. It copies the texture from the main memory to the texture cache.

A cache management process is called by the handle-texture process. It generates a free block in the texture cache. The cache management process returns a free address of the free block to the handle-texture process. The AGP-DMA process uses the free address as a destination address when moving the texture from the main memory. Thus the high-level application calls the set-render process of the graphics driver, which copies the texture in the main memory to the texture cache readable by the 3D graphics engine.

In further aspects of the invention a check-cache process is called by the handle-texture process. It determines when the texture is already present in the texture cache. The handle-texture process returns control to the set-render process when the check-cache process determines that the texture is already present in the texture cache.

In still further aspects a de-fragmenter is activated by the cache management process. It moves textures already in the texture cache to produce larger free block in the texture cache. Thus the texture cache is de-fragmented to enlarge free blocks.

In other aspects a list of textures is indexed by a texture handle from the high-level application. The list of textures includes pointers to the texture in the AGP portion of the main memory and pointers to the texture in the texture cache. The 3D graphics engine is unable to read textures from the main memory. The 3D graphics engine is only able to read textures from the texture cache.

DETAILED DESCRIPTION

The present invention relates to an improvement in AGP graphics drivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the accelerated graphics port (AGP) texture handling can be performed by the 3D graphics driver rather than by the application program or by the 3D graphics hardware. Having the 3D software driver perform AGP texture handling eliminates complex memory access hardware in the already-complex 3D-graphics engine, while still hiding the complexities of AGP texturing from the high-level application program.

Thus high-level application programs do not have to be specially written for AGP texture transfers. A single texture handle can be used by the application program, while the 3D graphics driver translates the handle to memory addresses, either the AGP memory in the main system DRAM, or the temporary texture in the graphics memory. The benefits of the AGP architecture then become available to older application programs. A restricted AGP Execute mode is obtained that uses the 3D graphics driver to manage the AGP textures.

Figure 4:
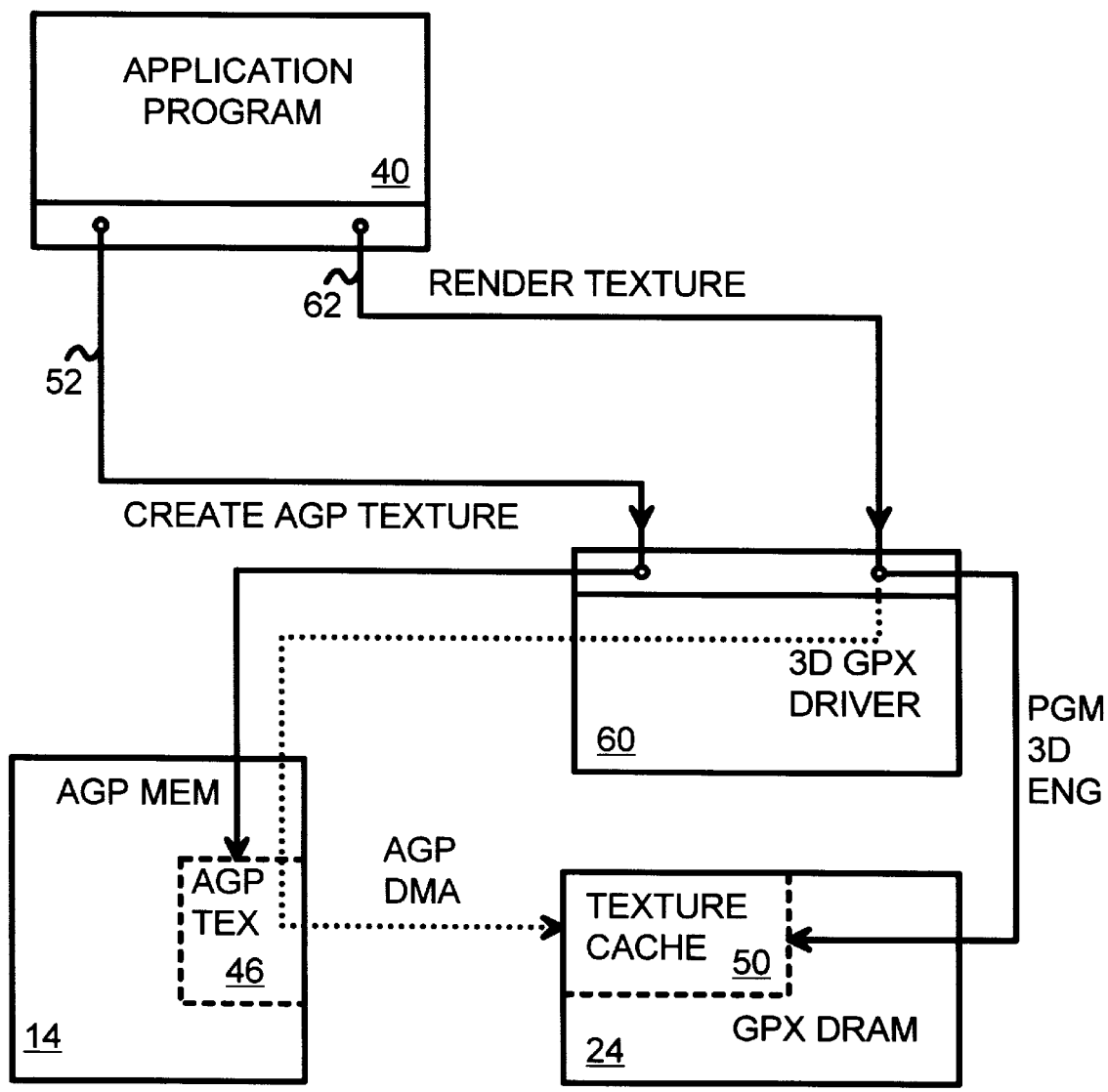
FIG. 4 is an interface diagram between a high-level 3D application and a 3D software driver that performs AGP texture management.

Simplified Application-Driver Interface—FIG. 4

FIG. 4 is an interface diagram between a high-level 3D application and a 3D software driver that performs AGP texture management. High-level application program 40 is a 3D application such as a game or presentation graphics and visualization applications. Application program 40 makes function call 52 to DirectX 3D graphics driver 60. DirectX 3D graphics driver 60 creates an AGP texture in AGP memory 14 when free space is not available in the local video memory. AGP memory 14 is part of the main system DRAM. DirectX 3D graphics driver 60 creates a space in AGP memory 14 for AGP texture 46.

No other AGP management functions are performed by application program 40. Instead, application program 40 makes call 62 to render the texture. When 3D graphics driver 60 receives render call 62, it copies the texture from AGP memory 14 to texture cache 50 in graphics memory 24. Texture cache 50 is maintained by 3D graphics driver 60 and thus a memory space has already been defined in graphics memory 24. 3D graphics driver 60 only has to free up space in texture cache 50 if texture cache 50 is full, and copy the texture data from AGP memory 14 to texture cache 50 in graphics memory 24.

Once 3D graphics driver 60 has copied the texture from AGP memory 14 to texture cache 50 in the local graphics memory, the 3D rendering engine is setup and instructed to begin rendering the texture from texture cache 50.

Figure 1:
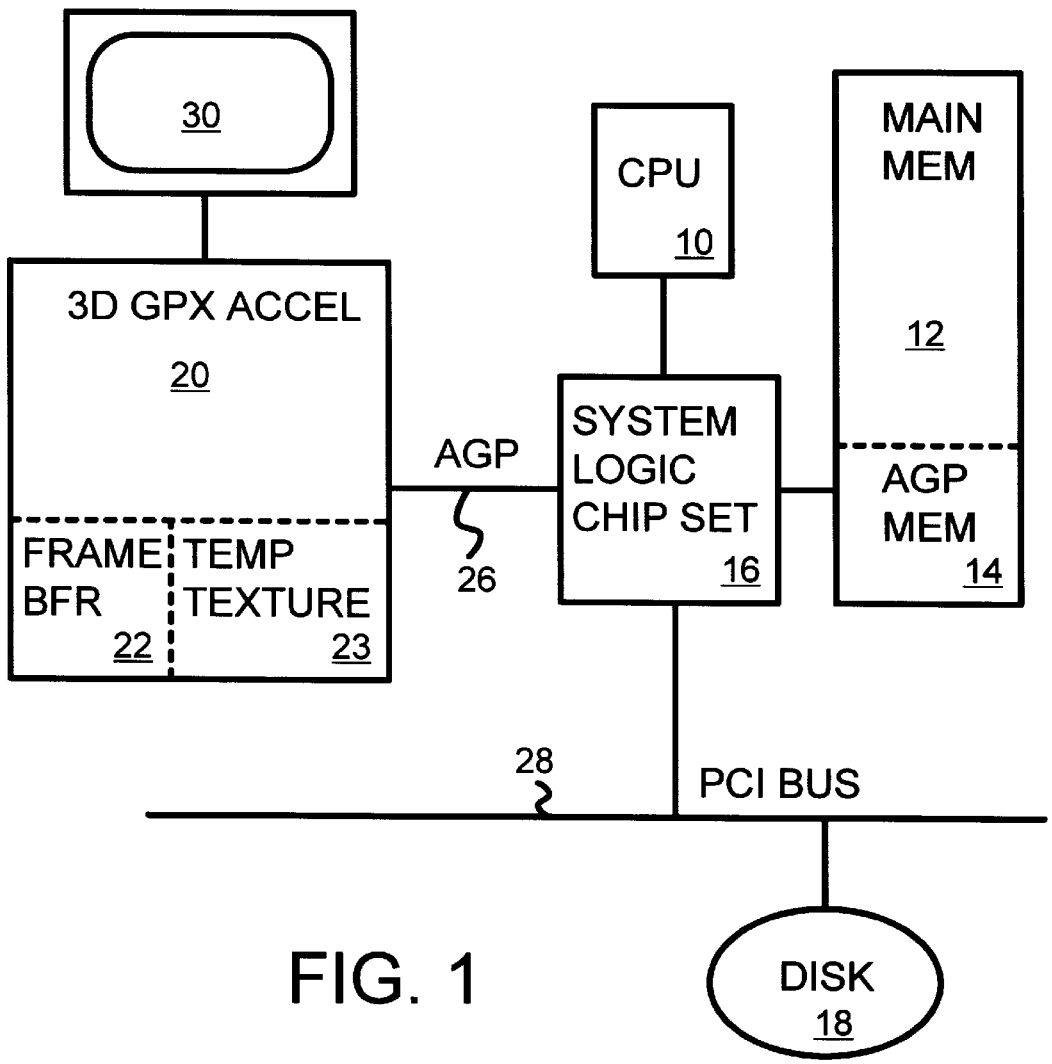
FIG. 1 is a diagram of a PC with an AGP bus and a 3D graphics accelerator.
Figure 2:
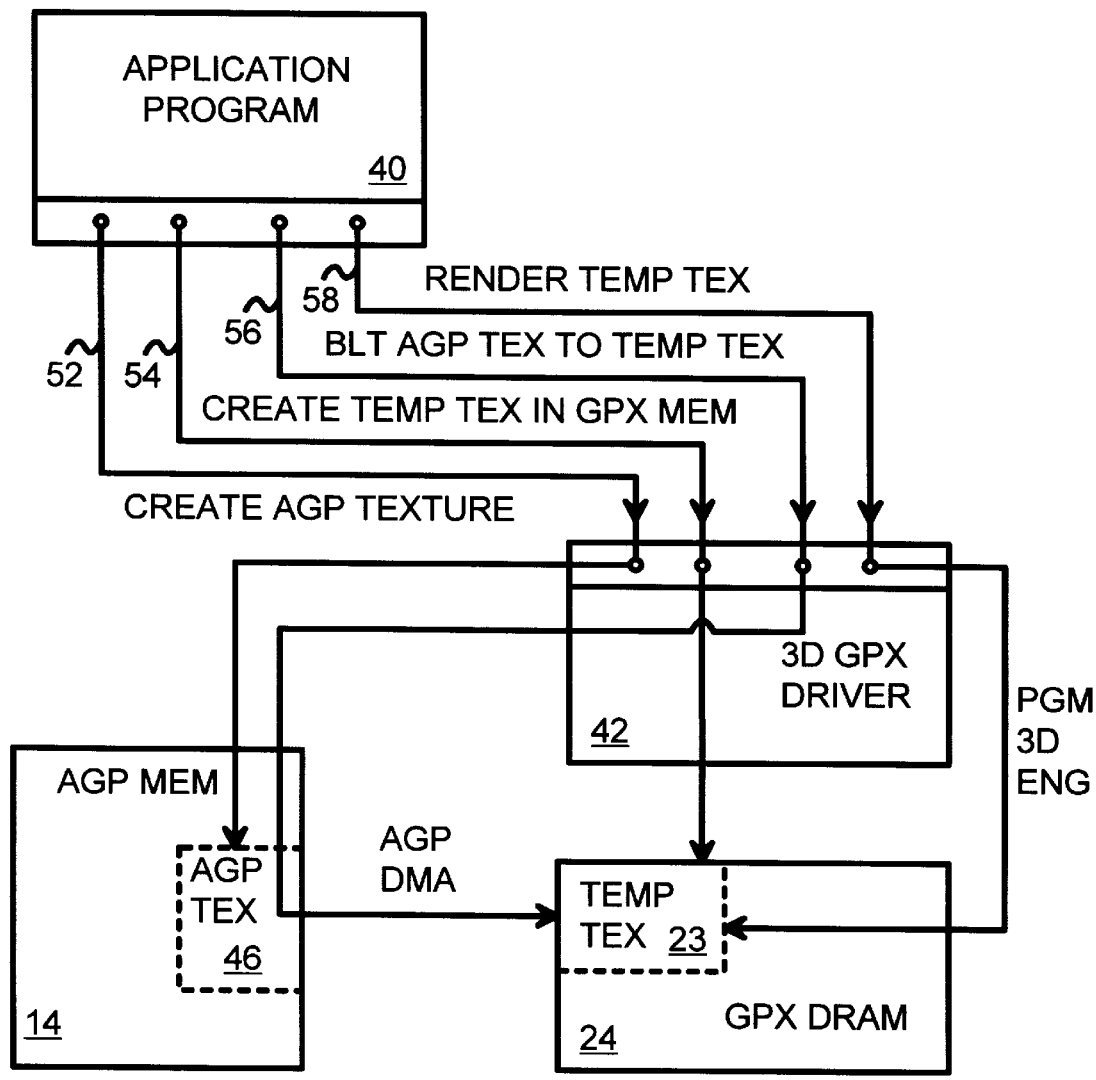
FIG. 2 is an interface diagram of a high-level application transferring a texture from the AGP memory to the temporary texture memory in the local video memory.
Figure 3:
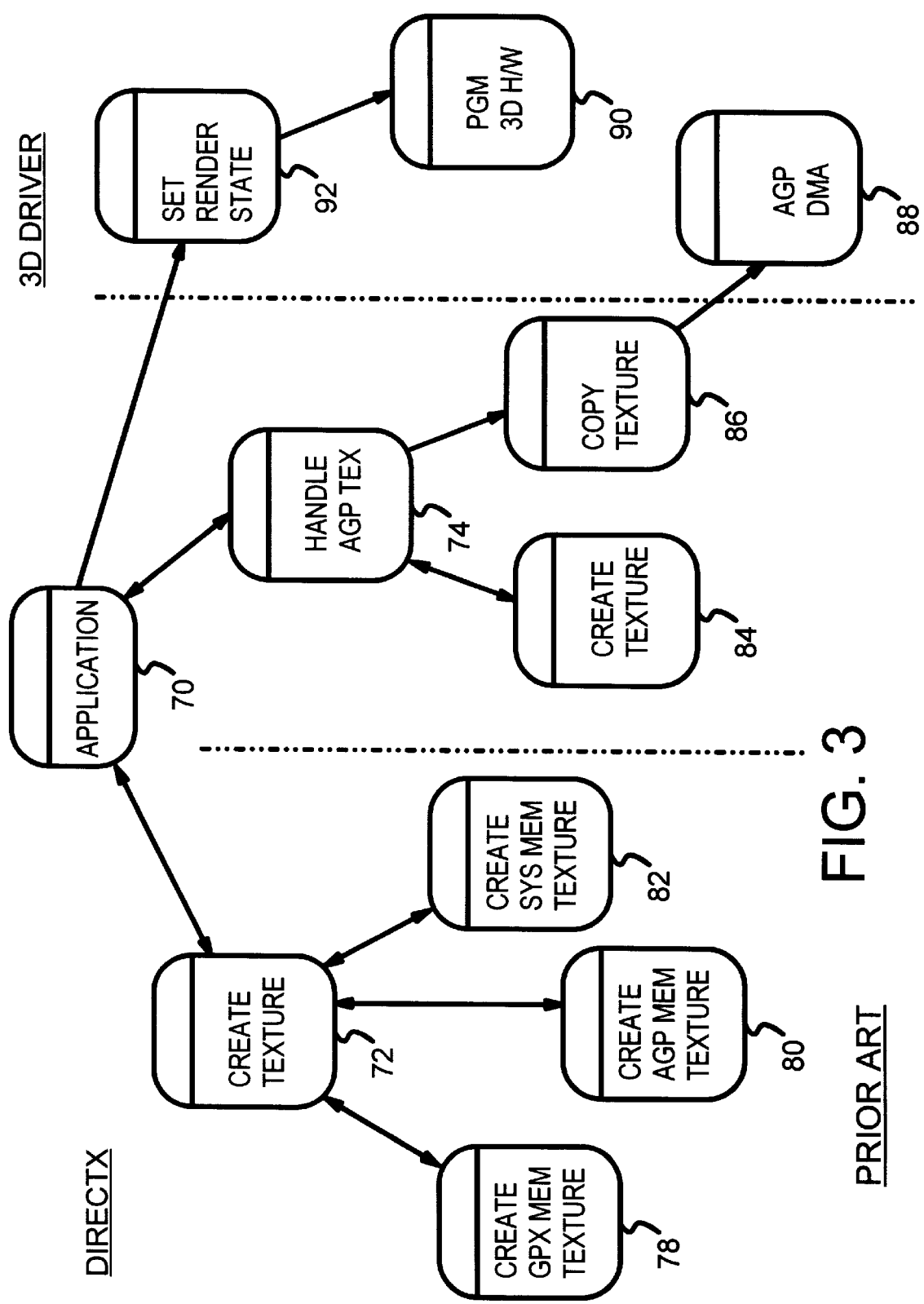
FIG. 3 is a structure chart of a high-level application performing under the AGP DMA model.

High-level application program 40 does not have to be aware of texture cache 50 or of the location of the texture in graphics memory 24. Since 3D graphics driver 60 performs the AGP direct-memory access (DMA) transfer, the details of the texture transfer are hidden from application program 40. Only 2 function calls from application program 40 to 3D graphics driver 60 need to be made, rather than the 4 calls required in the previous example of FIG. 2. Thus the application-driver interface is simplified.

Figure 5:
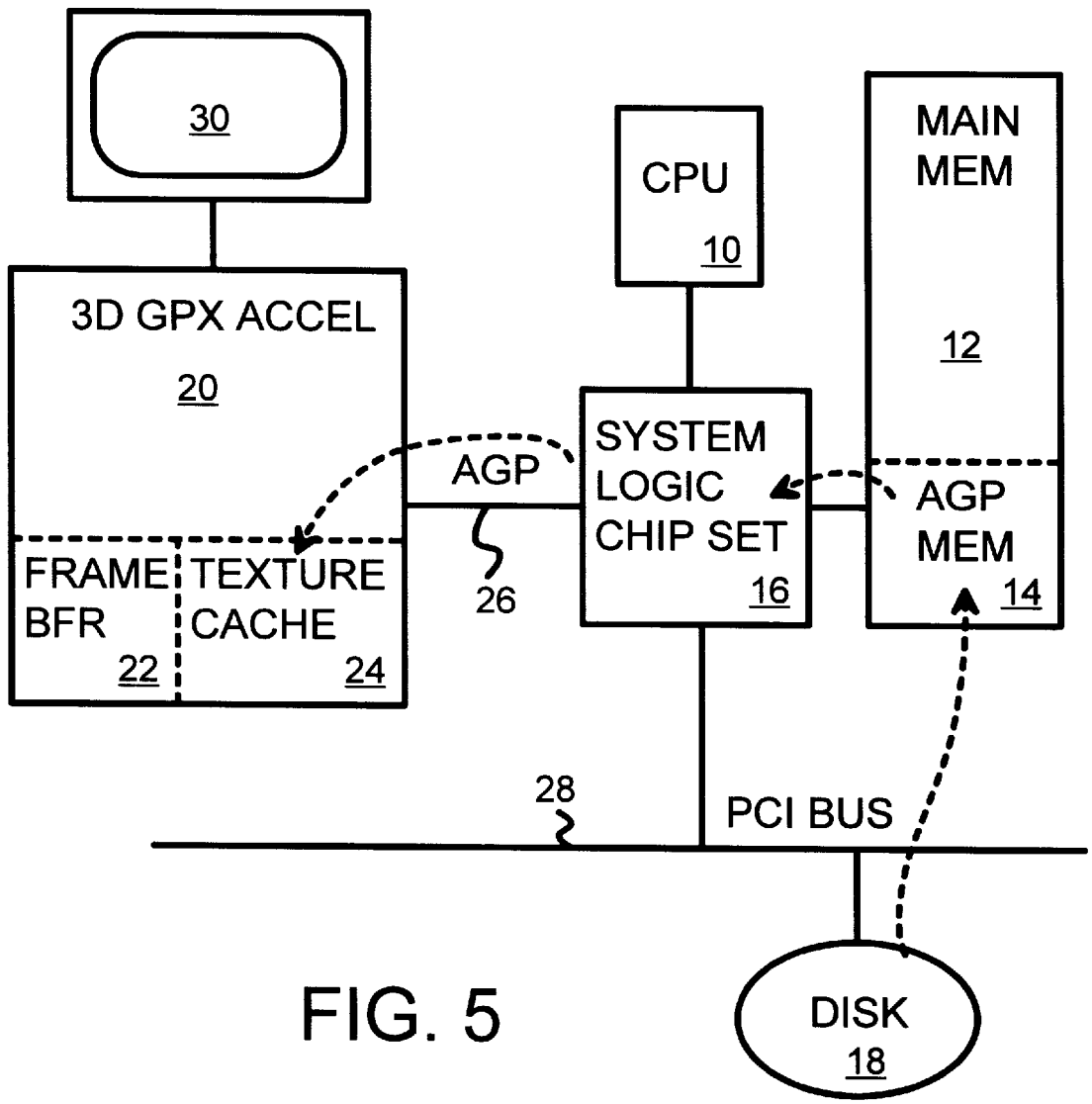
FIG. 5 shows how texture data is transferred within a PC by the 3D graphics driver.

Texture Data Transfer—FIG. 5

FIG. 5 shows how texture data is transferred within a PC by the 3D graphics driver. A microprocessor or central processing unit (CPU) 10 reads and writes main memory 12 through system-logic chip set 16. Peripherals such as disk 18 can be accessed over peripheral component interconnect (PCI) bus 28. Texture data in texture maps is either generated by the high-level application and stored in AGP memory 14 or on disk 18, or is copied from disk 18 to AGP memory 14. The application initiates the process to initialize a texture in memory from a bitmap image stored on disk. The actual copy/transfer might be done by the driver (if hardware accelerated), or by DirectX or by the application.

AGP bus 26 is a high-speed expansion bus, typically with only one expansion connector or slot, thus limiting bus loading and increasing speed. Signals on AGP bus 26 are generated by system-logic chip set 16 when CPU 10 accesses graphics accelerator 20 that is plugged into AGP bus 26. Graphics accelerator 20 drives pixels to display 30 using a three-dimensional 3D graphics engine. These pixels are stored in frame buffer 22. In a preferred embodiment the graphics accelerator 20 chip with the 3D graphics engine also has an embedded DRAM memory. The embedded DRAM memory contains the frame buffer as the on-screen graphics memory, and texture cache 50 as part of the off-screen graphics memory.

The Restricted-Execute AGP model is used by the system. A portion of main memory 12 is set aside as AGP memory 14. The AGP-Execute model is restricted to textures since only textures are stored in AGP memory 14 for use by the graphics system. In particular, 3D surface textures stored in AGP memory 14 are later transferred to texture cache 24 on the graphics chip by the 3D graphics driver software that is executed on CPU 10.

When a render function call is sent by the high-level application to the 3D graphics driver, CPU 10 calls the 3D driver and begins executing the driver. The driver transfers the AGP texture to local memory texture cache. The 3D hardware accelerator can only "execute" (render) textures in local graphics memory, and not in the AGP memory. The 3D driver manages texture cache 50 on the graphics accelerator 20 chip. The 3D graphics driver executing on CPU 10 then copies the desired texture from AGP memory 14 through system-logic chip set 16 and AGP bus 26 to texture cache 50 in the embedded graphics memory in graphics accelerator 20. A direct-memory access (DMA) transfer engine in graphics accelerator 20 is programmed by the 3D driver executing on CPU 10 for the transfer function. The 3D rendering engine in the graphics accelerator 20 chip then reads the texture pixels (texels) from texture cache 50 as triangles are rendered.

Figure 6:
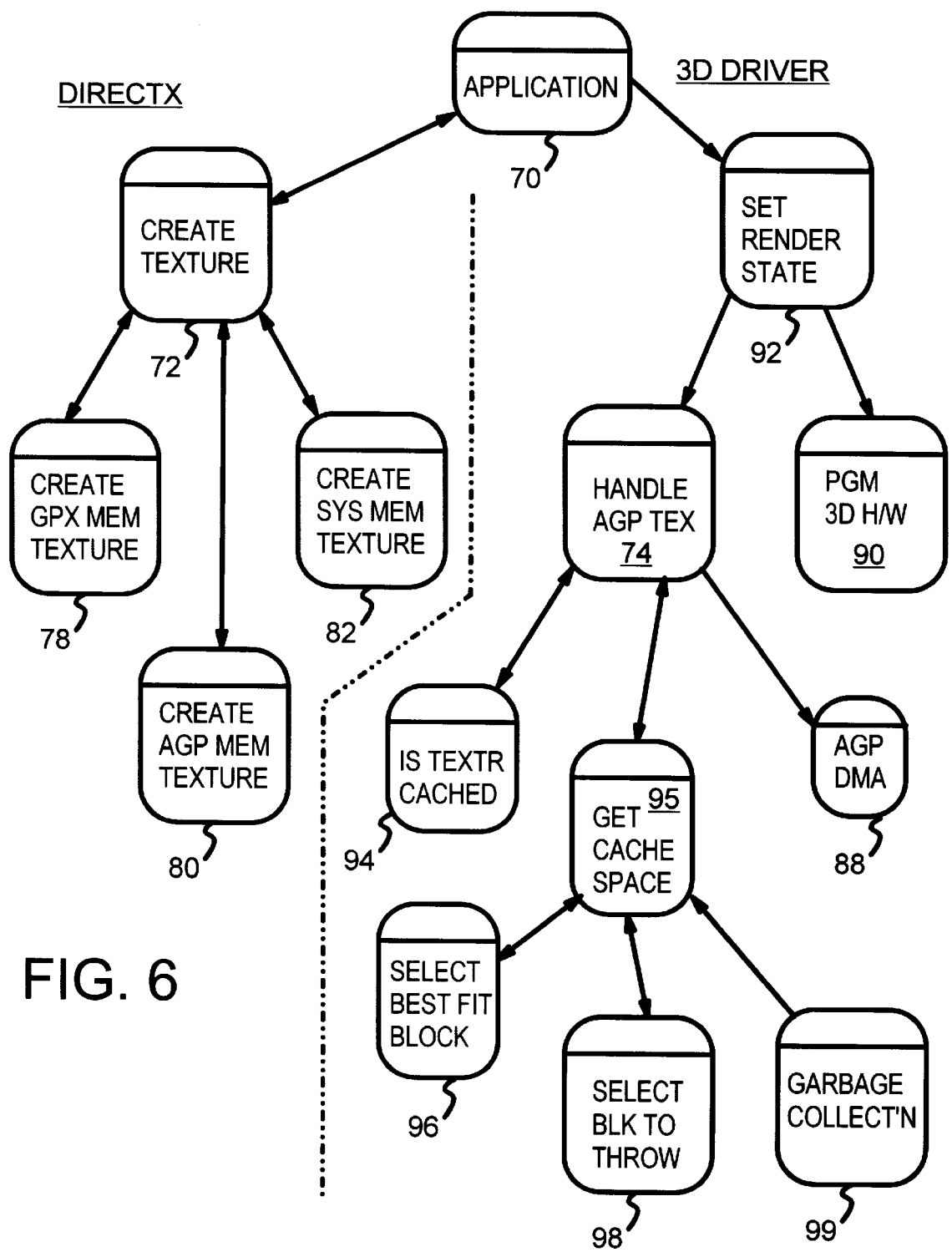
FIG. 6 is a structure chart of a AGP Restricted-Execute model 3D-graphics driver that caches textures and performs AGP DMA transfer.

3D Driver Performs AGP Handling—FIG. 6

FIG. 6 is a structure chart of an AGP Restricted-Execute Model 3D-graphics driver that caches textures and performs AGP DMA transfer. Application program 70 does not have to perform lower-level tasks to manage textures when the AGP Restricted-Execute model is used. Instead, application program 70 only has to create a texture in the AGP memory using DirectX functions; the 3D graphics driver manages the rest. The 3D graphics driver caches a copy of the texture in the local graphics memory when application program 70 makes a rendering call to process 92. Thus textures are only cached once rendering is started, not before. This makes the texture cache more efficient than the temporary texture memory, since textures are only moved to the local graphics memory once rendering is ready to begin.

To create a texture in the AGP memory, application program 70 sends a memory size for the texture to create-texture process 72, which returns an identifier or handle for the texture to application program 70. Create-texture process 72 then calls processes 78, 80, 82, depending on whether the application requested that a texture be created in the graphics, AGP, or main system memory, respectively, depending on memory availability.

When the application asks DirectX to create a texture, without specifying where to create it, if local video memory is available, the texture is created there. When there is no local video memory available, and if 3D driver supports the AGP Restricted-Execute model, the driver automatically creates the texture in AGP memory. This makes it possible for the existing applications, which are not designed for AGP to make use of AGP memory. If there is no AGP memory available, or if the 3D driver does not support the Execute model, the texture is created in system memory. Applications can also specifically create a texture in any one of the memory types, as it asks to create it in AGP memory when driver supports AGP DMA model. But then only (new) applications written for AGP can make use of it.

For each process 78, 80, 82, create-texture process 72 sends a memory-size parameter to the sub-process, while the sub-process returns a texture handle. These sub-processes 72, 78, 80, 82 are applications-programming interface (API) functions in Microsoft Corporation's DirectX API.

Once the texture has been created in the AGP memory, application program 70 requests that the 3D graphics engine render the texture by calling render-state process 92. The texture handle is sent with the function call. The 3D graphics driver then makes space in the texture cache in the local graphics memory for the AGP texture, and copies the texture from the AGP portion of the main memory to the texture cache in the local graphics memory. Thus the texture is transparently moved to the local graphics memory without the application program's knowledge.

The handle for the texture is sent by render-state process 92 to handle AGP texture process 74. First, handle AGP texture process 74 calls cache-check process 94 with the handle to see if the texture is already in the texture cache. If so, no further cache management is needed and handle AGP texture process 74 can return control to render-state process 92 and rendering can begin. Otherwise, the texture must be moved into the texture cache.

When the texture is not yet in the texture cache, handle AGP texture process 74 calls cache space process 95. Cache space process 95 calls best-fit process 96, which examines the free addresses and the required size for the new texture block, and chooses one block in the texture cache to put the new texture. The address of the selected block is returned to cache space process 95. Handle AGP texture process 74 maintains a lookup table of the texture blocks in the texture cache.

When best-fit process 96 is unable to locate a free block that is large enough to contain the new texture, cache space process 95 calls free-block process 98. Free-block process 98 finds the least-recently-used (LRU) texture in the cache and invalidates it. The address of the invalidated texture block is returned. The size of the new texture can be sent to free-block process 98 so that the least-recently-used texture that has a size at least as large as the needed size can be chosen rather than simply the LRU block.

Garbage collection process 99 is called to de-fragment the texture cache by moving blocks of textures around in the texture cache to free up larger blocks of the cache. It fills unused "holes" in memory by moving the following used blocks over. This makes a large block of free space available at the end of the cache. The addresses of the freed blocks are returned to cache space process 95.

Once a sufficiently large block in the texture cache has been found by cache space process 95, handle AGP texture process 74 activates the DMA transfer engine by calling AGP DMA process 88. AGP DMA process 88 performs the copy of the texture from the AGP portion of the main memory to the texture cache in the graphics memory. The address for the new texture block found by cache space process 95 is used by the DMA as the destination address.

Finally, the state of the 3D engine is set when render-state process 92 calls register-program process 90, which programs the 3D engine's registers. Register-program process 92 is not called until the texture has been transferred to the texture cache in the local graphics memory.

Processes 74, 88, 90, 92, 94, 95, 96, 98, 99 are part of the 3D graphics driver software. Since management of the texture cache in the graphics memory and the DMA transfer of the texture from the AGP memory are all handled by the 3D graphics driver, the application program does not have to be aware of the details of the graphics memory configuration.

Figure 7:
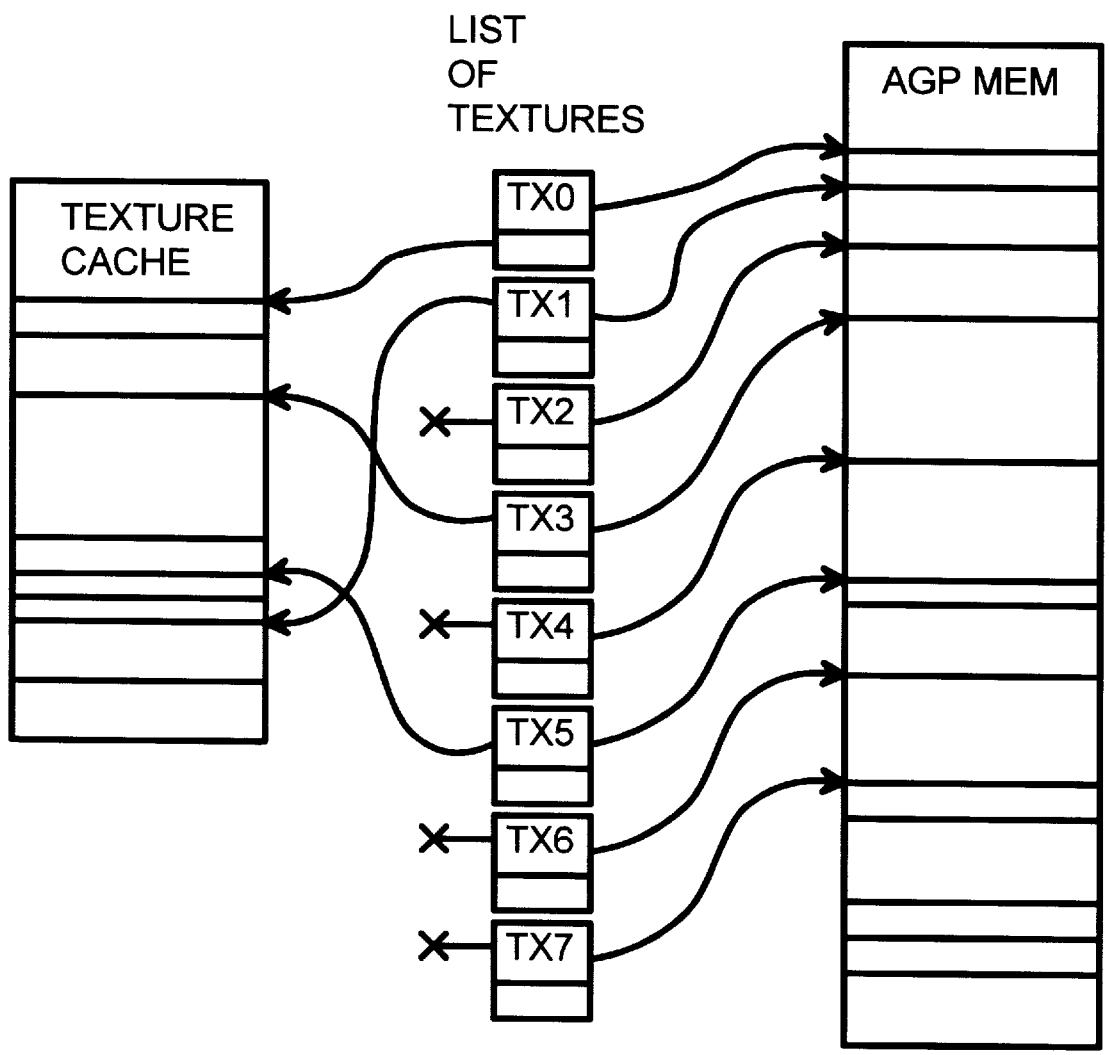
FIG. 7 highlights a list of textures in the AGP memory and texture cache maintained by the 3D graphics driver.

List of Textures—FIG. 7

FIG. 7 highlights a list of textures in the AGP memory and texture cache maintained by the 3D graphics driver. The AGP memory may contain many different textures that require different amounts of memory storage. The 3D graphics driver maintains a list of these textures, their handles, and the size and starting address of each texture. The texture cache is a software rather than a hardware cache in the preferred embodiment.

When a texture is copied to the texture cache in the graphics memory, the starting address within the texture cache for that texture is also stored in the list of textures. Thus the texture's handle can be used to locate a texture, whether the texture is in the texture cache or only in the AGP memory.

Some textures, such as textures TX2, TX4, TX6, TX7, are not currently cached and only have address pointers to the AGP main memory. Others, such as textures TX0, TX1, TX3, TX5 are currently cached and also have pointers to the block in the texture cache.

Offset addresses rather than full addresses can be stored in the list of textures if the starting address of the texture cache and the AGP portion of the main memory are stored elsewhere.

ADVANTAGES OF THE INVENTION

The invention provides a simplified interface between the high-level application program and the graphics driver. AGP functions are used without adding complex AGP memory texturing hardware to the 3D graphics engine. A copy of an AGP texture in a local graphics memory is transparently managed. AGP DMA transfers to the local graphics memory are performed transparently to high-level applications.

High-level application programs do not have to be specially written for AGP texture transfers. A single texture handle can be used by the application program, while the 3D graphics driver translates the handle to memory addresses, either the AGP memory in the main system DRAM, or the temporary texture in the graphics memory. The benefits of the AGP architecture then become available to older application programs.

Textures are only cached once rendering is started, not before. This makes the texture cache more efficient than the temporary texture memory, since textures are only moved to the local graphics memory once rendering is ready to begin. Only one texture handle needs to be stored by the application program for each texture, regardless of whether the texture is cached in the local graphics memory or is only in the AGP memory. Since management of the texture cache in the graphics memory and the DMA transfer of the texture from the AGP memory are all handled by the 3D graphics driver, the application program does not have to be aware of the details of the graphics memory configuration. The benefits of the AGP Execute model are achieved without adding AGP-texturing hardware to the 3D graphics accelerator.

ALTERNATE EMBODIMENTS

Several other embodiments are contemplated by the inventors. For example, other arrangements of software processes and modules can be used. Various object-oriented programming techniques and programming languages can be used. The AGP bus can be extended and modified from the present version, and new features can be added and its performance and bandwidth increased. Variations my be made in algorithms to select textures to be thrown from the cache (to make space for new texture) and in garbage collection mechanism. A look-ahead or pre-fetching mechanism can be added to the texture cache driver. Textures can be loaded before being needed by the 3D graphics engine. Texture cache management can be enhanced with DirectDraw, and DirectX support for AGP can be enhanced.

The AGP Memory consists of dynamically allocated areas of main system memory, which the graphics accelerator can access quickly. The quick access comes from built-in chip set hardware called GART (Graphics Address Remapping Table), which translates address so that the graphics controller sees a contiguous space in the main memory when in fact the pages are disjointed. GART is similar in function to the paging hardware in the CPU chip. In the future, GART logic might not be required as the standard CPU page tables may be configured to do the same remapping. This change would be transparent to the driver or software. Although AGP currently uses GART logic, it might not be required in the future.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A graphics driver for an accelerated graphics port (AGP) personal computer, the graphics driver comprising:
    a set-render process, called by a high-level application when a texture is ready for rendering by a 3D graphics engine;
    a handle-texture process, called by the set-render process before the 3D graphics engine is enabled to render the texture, for loading the texture into a texture cache readable by the 3D graphics engine;
    an AGP-DMA process, called by the handle-texture process, for copying the texture from the main memory to the texture cache; and
    a cache management process, called by the handle-texture process, for generating a free block in the texture cache, the cache management process returning a free address of the free block to the handle-texture process, the AGP-DMA process using the free address as a destination address when moving the texture from the main memory,
whereby the high-level application calls the set-render process of the graphics driver, which copies the texture in the main memory to the texture cache readable by the 3D graphics engine.

2. The graphics driver of claim 1 further comprising:
    a check-cache process, called by the handle-texture process, for determining when the texture is already present in the texture cache, the handle-texture process returning control to the set-render process when the check-cache process determines that the texture is already present in the texture cache.

3. The graphics driver of claim 2 further comprising:
    a de-fragmenter, activated by the cache management process, for moving textures already in the texture cache to produce larger free block in the texture cache, whereby the texture cache is de-fragmented to enlarge free blocks.

4. The graphics driver of claim 3 wherein the set-render process receives a texture handle from the high-level application, the texture handle identifying a location of the texture in a main memory of a personal computer, whereby the high-level application uses a single handle to identify a texture in the main memory that is also in the texture cache.

5. The graphics driver of claim 4 wherein the texture in the main memory is in an AGP portion of the main memory, the AGP portion for storing textures from the high-level application for rendering by the 3D graphics engine.

6. The graphics driver of claim 5 wherein the graphics driver further comprises:
    a list of textures, indexed by the texture handle from the high-level application, the list of textures including pointers to the texture in the AGP portion of the main memory and pointers to the texture in the texture cache.

7. The graphics driver of claim 6 wherein the 3D graphics engine is unable to read textures from the main memory, the 3D graphics engine only able to read textures from the texture cache.

8. The graphics driver of claim 7 wherein the AGP-DMA process activates a direct-memory access (DMA) transfer engine for transferring the texture.

9. A personal computer comprising:
    a central processing unit (CPU) for executing user programs and software drivers;
    a main memory, for storing portions of the user programs and software drivers read by the CPU and for storing data;
    an accelerated graphics port (AGP) portion of the main memory for storing textures used by a user program that generates 3D graphics;
    a system-logic chip set, coupled between the CPU and the main memory, for transferring data between the CPU and the main memory;
    a graphics accelerator, controlled by a software driver executing on the CPU, for rendering pixels for display to a user on a display, the graphics accelerator including:
        a 3D rendering engine for applying textures to pixels;
        a graphics memory for storing pixels for display;
        a texture cache within the graphics memory, for storing a copy of a texture from the AGP portion of the main memory;
    an AGP bus, coupled between the system-logic chip set and the graphics accelerator, for transferring graphics data and instructions to the graphics accelerator; and
    a 3D graphics driver, executed by the CPU, for controlling the graphics accelerator, the 3D graphics diver for managing the texture cache, the 3D graphics driver copying a texture from the AGP portion of the main memory through the system-logic chip set, over the AGP bus to the texture cache when a user program instructs the 3D graphics driver to render a texture in the AGP portion of the main memory, whereby the 3D graphics driver, transparently to the user program, transfers textures from the AGP portion of the main memory to the texture cache in the graphics memory when 3D rendering is requested.

10. The personal computer of claim 9 further comprising:
   an expansion bus, coupled to the system-logic chip set, containing expansion slots for receiving expansion cards; and
   a disk for storing data and user programs, the disk controlled by a controller plugged into an expansion slot of the expansion bus,
wherein user programs are transferred from the disk to the main memory.

11. The personal computer of claim 10 wherein the disk also stores textures used by the user program, the textures transferred from the disk to the AGP portion of the main memory by the user program, but the textures copied from the AGP portion of the main memory to the texture cache in the graphics memory by the 3D graphics driver.

12. The personal computer of claim 9 wherein the graphics memory is an embedded dynamic-random-access memory (DRAM) on a same chip as the 3D rendering engine, the texture cache being accessed by the 3D rendering engine,
whereby the texture cache is in an embedded DRAM on a same chip as the 3D rendering engine.

13. The personal computer of claim 12 wherein the graphics memory further comprises a frame buffer for storing the pixels for display, the texture cache being in an off-screen portion of the graphics memory.

14. The personal computer of claim 9 wherein an interface between the user program and the 3D graphics driver comprises:
   a create-texture function call for creating a texture in the AGP portion of the main memory; and
   a rendering function call for requesting that the 3D rendering engine begin rendering a texture from the AGP portion of the main memory by altering pixels for display to reflect the texture;
   wherein the 3D graphics driver copies the texture from the AGP portion of the main memory to the texture cache response to the rendering function call before the 3D graphics driver instructs the 3D rendering engine to begin rendering the texture from the texture cache,
whereby the 3D graphics driver copies the texture to the texture cache without an explicit function call from the user program.

15. The personal computer of claim 14 wherein the AGP bus is connected only to the graphics accelerator and not to any other devices, wherein the AGP bus has no more than one connector, the one connector for connecting to the graphics accelerator,
whereby the AGP bus is a dedicated graphics bus.

16. A computer-program product comprising:
   a computer-usable medium having computer-readable program code means embodied therein for controlling a 3D graphics accelerator chip and managing a texture cache, the computer-readable program code means in the computer-program product comprising:
   set-render means, called by a high-level application when a texture in a main memory is ready for rendering by a 3D graphics engine, for setting rendering registers in the 3D graphics engine;
   wherein the 3D graphics engine is unable to read textures from the main memory, the 3D graphics engine only able to read textures from the texture cache;
   handle-texture means, called by the set-render means before the 3D graphics engine is enabled to render the texture, for loading the texture into the texture cache readable by the 3D graphics engine;
   texture-transfer means, called by the handle-texture means, for copying the texture from the main memory to the texture cache; and
   cache management means, called by the handle-texture means, for generating a free block in the texture cache, the cache management means returning a free address of the free block to the handle-texture means, the Texture-transfer means using the free address as a destination address when moving the texture from the main memory,
whereby the high-level application calls the set-render means to copy the texture in the AGP portion of the main memory to the texture cache readable by the 3D graphics engine.

17. The computer-program product of claim 16 wherein the computer-readable program code means further comprises:
   check-cache means, called by the handle-texture means, for determining when the texture is already present in the texture cache, the handle-texture means returning control to the set-render means when the check-cache means determines that the texture is already present in the texture cache; and
   de-fragment means, activated by the cache management means, for moving textures already in the texture cache to produce larger free block in the texture cache,
whereby the texture cache is de-fragmented to enlarge free blocks.

18. The computer-program product of claim 17 wherein the set-render means receives a texture handle from the high-level application, the texture handle identifying a location of the texture in a main memory of a personal computer, whereby the high-level application uses a single handle to identify a texture in the main memory that is also in the texture cache.

19. The computer-program product of claim 18 wherein the texture in the main memory is in an accelerated graphics port (AGP) portion of the main memory, the AGP portion for storing textures from the high-level application for rendering by the 3D graphics engine.

20. The computer-program product of claim 19 wherein the computer-readable program code means further comprises:
   a list of textures, indexed by the texture handle from the high-level application, the list of textures including pointers to the texture in the AGP portion of the main memory and pointers to the texture in the texture cache.

* * * * *